United States Patent
Singh et al.

(10) Patent No.: US 11,271,773 B2
(45) Date of Patent: Mar. 8, 2022

(54) ARRANGEMENT AND METHOD FOR CONNECTING VARIOUS INTEGRATED CIRCUITS IN AN AUTOMOTIVE CONTROL SYSTEM

(71) Applicant: Integrated Device Technology, Inc., San Jose, CA (US)

(72) Inventors: Manjit Singh, Fremont, CA (US); Serge Di Matteo, Biassono (IT); Jan Krellner, Rancho Mission Viejo, CA (US); Kenneth C. Kwok, Irvine, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 88 days.

(21) Appl. No.: 16/621,671

(22) PCT Filed: Jun. 14, 2018

(86) PCT No.: PCT/EP2018/065905
§ 371 (c)(1),
(2) Date: Dec. 11, 2019

(87) PCT Pub. No.: WO2018/229238
PCT Pub. Date: Dec. 20, 2018

(65) Prior Publication Data
US 2020/0127872 A1    Apr. 23, 2020

Related U.S. Application Data

(60) Provisional application No. 62/519,744, filed on Jun. 14, 2017.

(51) Int. Cl.
*H04L 12/40*    (2006.01)
*G06F 11/10*    (2006.01)
*H04L 41/147*   (2022.01)

(52) U.S. Cl.
CPC .... *H04L 12/40176* (2013.01); *G06F 11/1004* (2013.01); *H04L 41/147* (2013.01); *H04L 2012/40273* (2013.01)

(58) Field of Classification Search
CPC .......... H04L 12/40176; H04L 41/147; H04L 2012/40273; H04L 2012/4026;
(Continued)

(56) References Cited

U.S. PATENT DOCUMENTS

| | | | |
|---|---|---|---|
| 10,800,449 B2 * | 10/2020 | Bernon-Enjalbert | B62D 5/0493 |
| 2003/0050735 A1 * | 3/2003 | Griffis | G05B 19/4061 700/255 |
| 2014/0281753 A1 * | 9/2014 | Wagh | G06F 11/0745 714/56 |
| 2015/0280904 A1 * | 10/2015 | Tang | H04L 7/048 714/758 |

(Continued)

FOREIGN PATENT DOCUMENTS

| DE | 102016102259 A1 * | 8/2017 | .......... B62D 5/0493 |
| WO | WO-2017137222 A1 * | 8/2017 | .......... B62D 5/0493 |

OTHER PUBLICATIONS

Bernon-Enjalbert et al., "Safety-Integrated Hardware Solutions to Support ASIL-D Applications," Jan. 1, 2013, pp. 1-9.
(Continued)

*Primary Examiner* — Jay P Patel
(74) *Attorney, Agent, or Firm* — Haynes and Boone, LLP

(57) ABSTRACT

The invention relates to an arrangement and a method performing data exchange between various integrated circuits, IC, (3,4,5,6,7) in an automotive control system wherein the data are exchanged by a bus and has the object to enable ASIL C/D system coverage and to tie various ICs (clocks, regulators, memory interfaces, sensor signal conditioners, power management ICs etc.) This is solved the data are exchanged by a bus being ASIL C/D compliant and forming a common protocol to exchange information among the integrated circuits (3,4,5,6,7). The method is solved by functions implemented within the bus as setting the fre-
(Continued)

Figure 1:
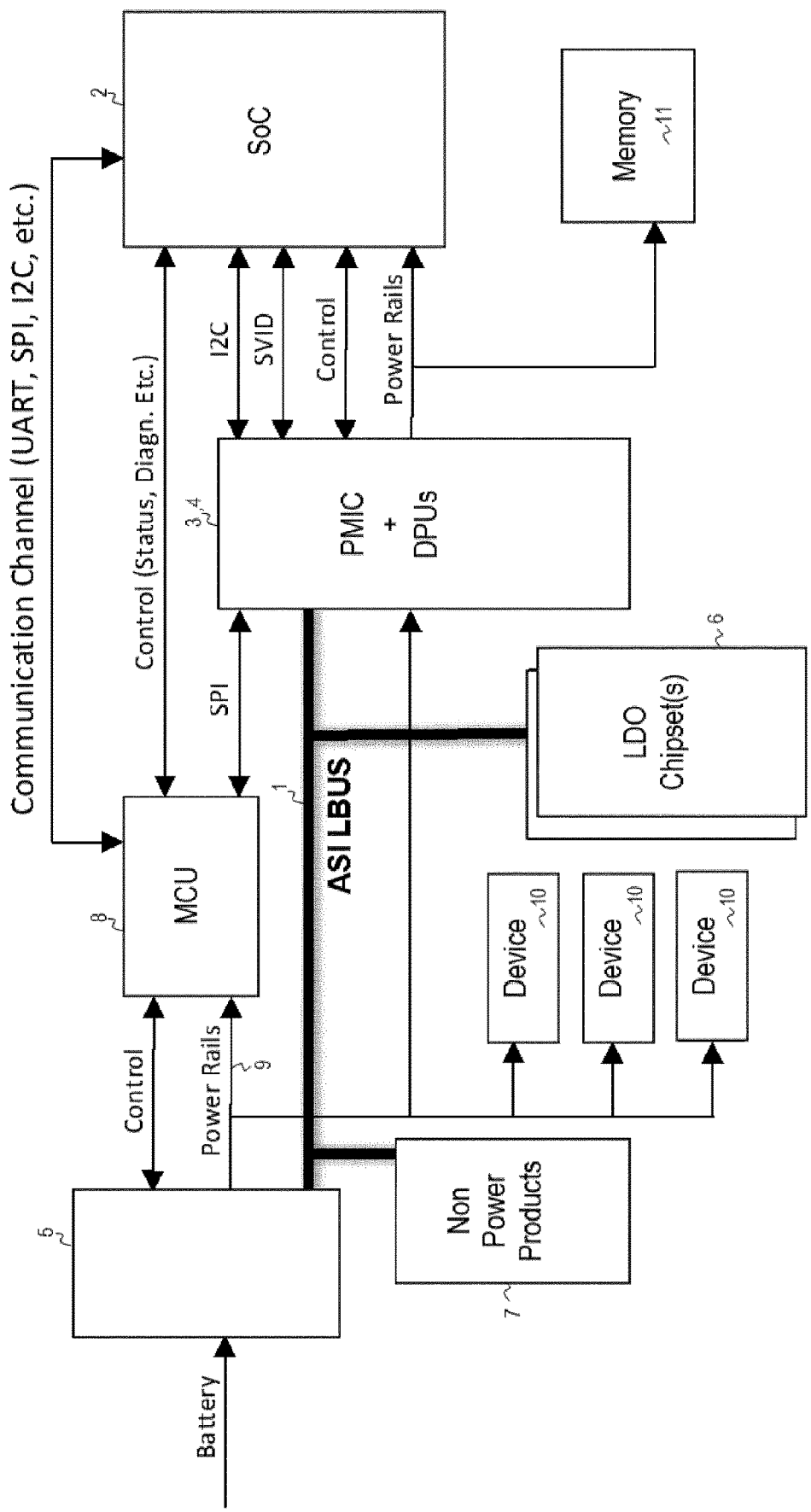

quency of operation; arbitrating roles of the integrated circuits as master or slave device; checking integrity of exchanged data; frame repetition; detecting bus stuck-at failure modes; filtering or denouncing failures and warnings from peripheral devices; detecting remote out of specification local clock; and monitoring and predicting system reliability and profiling maintenance events.

19 Claims, 2 Drawing Sheets

(58) Field of Classification Search
CPC ..... H04L 2012/40267; H04L 12/40169; H04L 43/0823; H04L 12/40026; H04L 12/40065; H04L 12/40078; H04L 12/40084; H04L 12/40104; G06F 11/1004; G06F 11/0745
See application file for complete search history.

(56) References Cited

U.S. PATENT DOCUMENTS

2018/0137596 A1\* 5/2018 Chenu .................. H04N 7/183
2019/0039644 A1\* 2/2019 Bernon-Enjalbert ....................... B62D 5/0484

OTHER PUBLICATIONS

Hamperl, "Technical Specification: SafeSPI—Serial Peripheral Interface for Automotive Safety, Rev. 1.0," Jun. 3, 2016, pp. 1-21.
Industrial Communication Networks—Profiles—Part 3: Functional Safety Fieldbuses—General Rules and Profile Definitions, IEC 61784-3:2016, IEC, 3, Rue De Varembé, PO Box 131, CH-1211 Geneva 20, Switzerland, May 13, 2016 pp. 1-84.
Notification Concerning Transmittal of International Preliminary Report on Patentability from PCT/EP2018/065905, dated Dec. 26, 2019, pp. 1-10.

\* cited by examiner

ARRANGEMENT AND METHOD FOR CONNECTING VARIOUS INTEGRATED CIRCUITS IN AN AUTOMOTIVE CONTROL SYSTEM

The present application claims priority to International Patent Application No. PCT/EP2018/065905 entitled "ARRANGEMENT AND METHOD FOR CONNECTING VARIOUS INTEGRATED CIRCUITS IN AN AUTOMOTIVE CONTROL SYSTEM," filed 14 Jun. 2018, which claims priority to U.S. Provisional Patent Application No. 62/519,744 entitled "ASILBUS Implementation," filed 14 Jun. 2017, all of which are incorporated by reference herein in their entirety.

The invention relates to an arrangement for connecting various integrated circuits (IC) in an automotive control system wherein at least two integrated circuits are connected by a bus.

The invention relates also to a method of performing data exchange between various integrated circuits (IC) in an automotive control system wherein the data are exchanged by a bus.

The term automotive in this application shall mean all applications for commercial and non-commercial automotive, drones, robotics or industrial automation.

Increasing number of automakers are moving towards more powerful System on Chips (SoCs) to accommodate a large amount of raw data that sensors produce to achieve safe driving condition when vehicle is autonomously driving. In such mode of operation, safety is of paramount importance. Therefore, electronic components requirements are moving from AECQ100 only to more and more Automotive Signal Integrity Level (ASIL). ASIL is a risk classification scheme defined by the Functional Safety for Road Vehicles standard. This classification helps defining the safety requirements necessary to be in line with the standard. The ASIL is established by performing a risk analysis of a potential hazard by looking at the Severity, Exposure and Controllability of the vehicle operating scenario. The safety goal for that hazard in turn carries the ASIL requirements.

There are four ASILs identified by the standard: ASIL A, ASIL B, ASIL C, ASIL D. ASIL D dictates the highest integrity requirements on the product and ASIL A the lowest.

For example, even for infotainment systems electronics, the trend is to achieve minimum of ASIL-B compliance whereas in the past only AECQ100 would suffice. For ADAS (Advanced Driver Assistance System) systems, the trend is towards ASIL C/D at a system/module level. Therefore, increasing number of integrated circuits (ICs) are required to be ASIL C/D compliant.

The object of the invention is to enable ASIL C/D system coverage and to tie various ICs (clocks, regulators, memory interfaces, sensor signal conditioners, power management ICs etc.)

The object is achieved by an arrangement for connecting various integrated circuits in an automotive control system wherein at least two integrated circuits are connected by a bus being ASIL C/D compliant and forming a common bus protocol to exchange information among the integrated circuits. The bus is at least provided with the following features:

Means for setting the frequency of operation;
Thereby the frequency of operation can be adopted to the actual circumstances to ensure safe functions of all members. The frequency can be chosen with 1 MHz, 2 MHz or higher.

Means for arbitrating roles of the integrated circuits as master or slave device;
There can be multiple methods of arbitration to decide who, among many devices connected to bus, will become master. This can be a rotating master basis (e.g. a token based system where the token holder device is the master and token is held by a device a definite period of time), master-less arrangement as well where master role is assumed by the host device (PMIC, microcontroller (MCU) etc.), or a main-master along with a redundant backup master device.

Means for checking integrity of exchanged data;
CRC check is preferably used which is more robust method. A cyclic redundancy check (CRC) is an error-detecting code commonly used to detect accidental changes to raw data. Blocks of data entering these systems get a short check value attached, based on the remainder of a polynomial division of their contents. On retrieval, the calculation is repeated and, in the event the check values do not match, corrective action can be taken against data corruption. CRCs can be used for error correction.

In regard of the present invention, the data integrity check between the ICs is based on implementing both spatial (CRC) and temporal (Frame repetition) redundant check. 3-bit CRC is generated by each data sender during their allocated time slot. The polynomial used for this CRC is TBD. Failures data information are validated in case of two consecutives data transaction with no CRC errors.

Means for frame repetition, i.e. periodically gathering failures data information from each slave by a broadcast-inquiring by the master;
This is the broadcast inquire by the master that periodically gathers failures data information (e.g. 5-bit data) by each slave. Each slave generates this failure field information including failure flags related to (1) junction temperature, (2) over current, (3) over voltage, (4) silicon failure, (5) warning alarm. Each slave appends 3-bit CRC field for protecting the data field against systematic or random failures. The allocation of the answering time slots is based on the slave address as determined during the power on phase by the value of a pull-down resistor connected to each slave.

A mechanism to detect bus stuck-at failure modes;
Data encoding mechanism is a single Pulse Width Modulation (PWM). Therefore the stuck at mechanism is based on counting the rising or falling edges. These are independent by the data fields contents and must be equal to the length of the overall data transaction. Any discrepancy to this rule is determined by a physical stuck-at at system level or by a logical one at slave level.

A Mechanism to filter or denounce failures and warnings from peripheral devices;
For each failure, a counter of TBD bit can be configured for validating and transferring to the bus those failures having a duration longer than an expected time.
Warning/Alarm mechanism is physically implemented as a failure detection mechanism. However, allows to define threshold within the in-range specification and about the configured parameter that is selected to be monitored (i.e. current, voltage, temperature).

Means for detecting remote out of specification local clock;
Slaves use local clock timing. This cannot be thoroughly monitored by any timing measurement of the bus transaction because of the too short time. However, by implementing a TBD bit counter into DPU it is possible to install a remote clock timing check by few bus commands (i.e. (1) counter stop, (2) counter run, (3) counter reset). This allows very precise long term timing measurements driven by master.

Means for monitoring and predicting system reliability and profiling maintenance events.

The regular and periodic gathering of IC temperatures allows collecting the precise temperature information about the neighbor surrounding discrete components which directly exposed to the junction temperature effect. This allows to maintain updated the actual temperature profile of the application and comparing it against the assumed one. In case of negative discrepancies, this information allows to plan and execute those required maintenance strategies (e.g. replacement of the sub-system with a new one).

Claims 2 to 7 relate to further embodiments of the invention.

The object of the invention is also solved by a method of performing data exchange between various integrated circuits in an automotive control system wherein the data are exchanged by a bus being ASIL C/D compliant and forming a common protocol to exchange information among the integrated circuits. The method is comprising the following steps:
  setting the frequency of operation;
  arbitrating roles of the integrated circuits as master or slave device;
  checking integrity of exchanged data;
  frame repetition, i.e. periodically gathering failures data information from each slave by a broadcast-inquiring by the master;
  detecting bus stuck-at failure modes;
  filtering or denouncing failures and warnings from peripheral devices;
  detecting remote out of specification local clock; and
  monitoring and predicting system reliability and profiling maintenance events.

The technical functions of these steps have already been described in connection with the corresponding features of the arrangement.

Claims 7 to 9 show various configurations of the method.

The invention will now be explained in more detail with an example. In the corresponding drawings FIG. 1 shows a typical automotive system board/module FIG. 2 shows a Functional Safety PMIC (IDTP860x) and Functional Safety DPUs (IDTP8610) connected by a bus.

In the following the bus 1 is named ASILBUS 1 to demonstrate, that with die inventive configuration of the ASILBUS an ASIL-C compliance is achieved. The ASILBUS 1 is a single wire interface bus.

Figure 2:
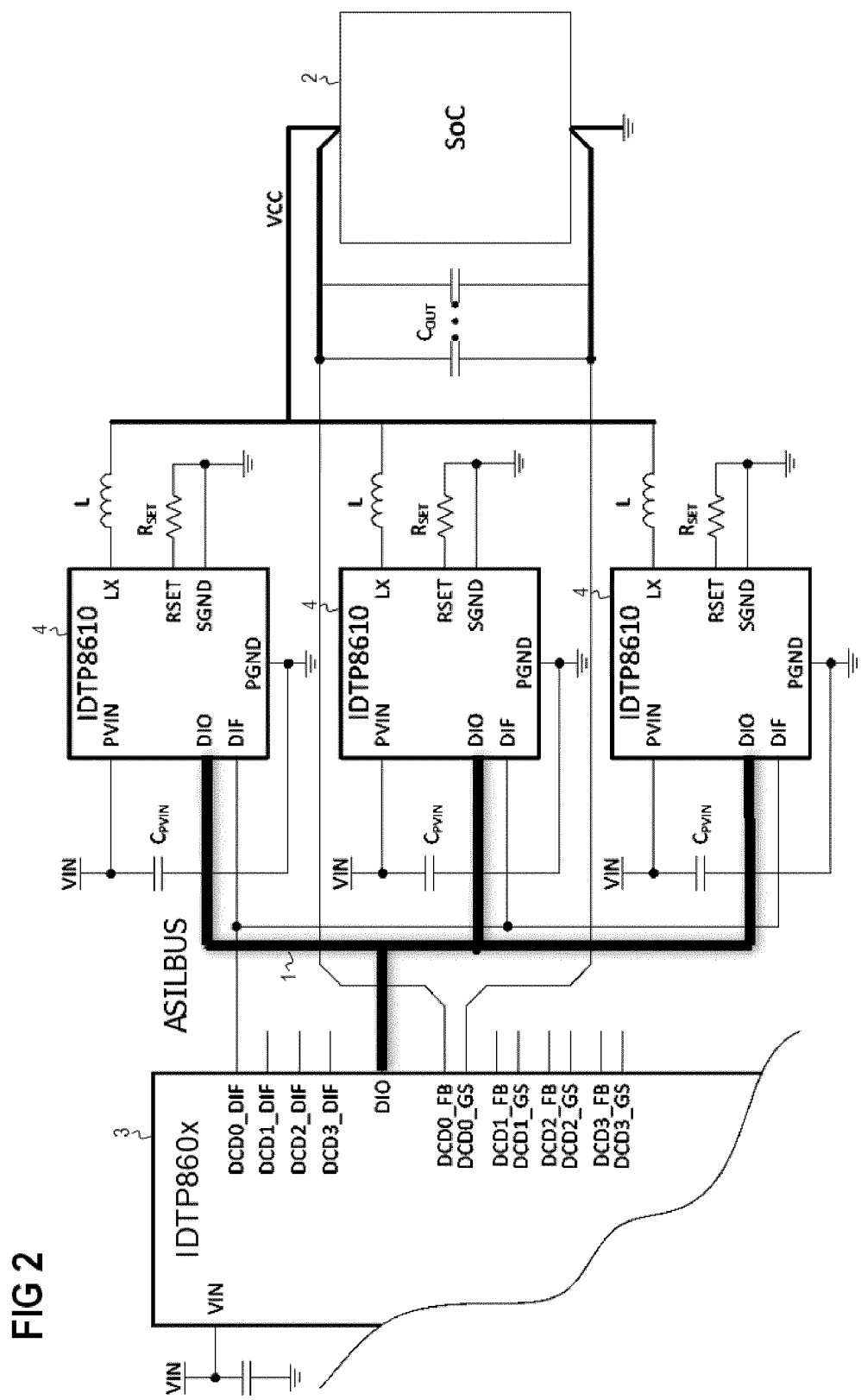

The arrangement of FIG. 1 is provided with an automotive SoC 2 (System on Chip), a PMIC 3 (Power Management Integrated Circuit) DPUs 4, a Pre-Regulator 5, LDO chipset 6 (Low-Dropout Regulator—a DC linear voltage regulator), and Non-Power Products 7. These ICs are connected by the ASILBUS 1 to provide expansive ASIL coverage at system level that covers power ICs 2; 3; 4; 5; 6 and Non-Power ICs 7.

Further are shown in FIG. 1 a Microcontroller 8 for controlling the arrangement. The Microcontroller 8 is connected via Power Rails 9 with the Pre-Regulator 5. Also connected to the Power Rails 9 are Devices 10. Further is provide a Memory 11.

The PMIC 3 is depending on external components such as, but not limited to, clocks, LDOs, memory devices 11, power stages such as DPUs 4 to ensure power delivery to SoC 2 is safe, as shown in FIG. 2.

By the use of the ASILBUS 1 after setting the frequency of operation it is arbitrated that the DPUs 4 play the slave role and the PMIC 3 plays the master role.

According to the present invention, the data integrity check between PMIC 3 (P860x) and DPU 4 (P861x) is based on implementing both spatial (CRC) and temporal (Frame repetition) redundant check. 3-bit CRC is generated by each data sender during their allocated time slot. Failures data information are validated in case of two consecutives data According to a broadcast inquire the PMIC 3 (master) periodically gathers failures data information (e.g. 5-bit data) by each DPU 4 (slave). Each DPU 4 generates this failure field information including failure flags related to (1) junction temperature, (2) over current, (3) over voltage, (4) silicon failure, (5) warning alarm. Each DPU 4 appends 3-bit CRC field for protecting the data field against systematic or random failures. The allocation of the answering time slots is based on the address of the DPU 4 as determined during the power on phase by the value of a pull-down resistor connected to each DPU 4.

Data encoding mechanism is a single wire Pulse Width Modulation (PWM). Therefore the stuck at mechanism is based on counting the rising or falling edges. These are independent by the data fields contents and must be equal to the length of the overall data transaction. Any discrepancy to the rule is determined by a physical stuck-at at system level or by a logical one at the level of the DPUs 4 (slave).

DPUs 4 use local clock timing. This cannot be thoroughly monitored by any timing measurement of the ASILBUS 1 transaction because of the too short time. However, by implementing a TBD bit counter into DPU 4 it is possible to install a remote clock timing check by few ASILBUS 1 commands (i.e. (1) counter stop, (2) counter run, (3) counter reset). This allows very precise long term timing measurements driven by PMIC 3.

The regular and periodic gathering of DPU 4 temperatures allows collecting the precise temperature information about the neighbor surrounding discrete components which directly exposed to the junction temperature effect. This allows to maintain updated the actual temperature profile of the application and comparing it against the assumed one. In case of negative discrepancies, this information allows to plan and execute those required maintenance strategies (e.g. replacement of the sub-system with a new one).

As further shown in FIG. 1 it is plausible to implement (partially or wholly) the concept of ASILBUS 1 with industry standard interfaces such as I2C, PMBUS, SMBUS, SVID, SPI, SCSI, PCIe, USB etc by adding additional layers of protocol. Each of such implementation may have additional overhead, cost, and performance metrics. To that end, it is also possible to implement the core of ASILBUS 1 in a standalone product as shown in FIG. 1 and FIG. 2.

REFERENCE NUMBERS 1 bus, ASILBUS
2 automotive SoC
3 PMIC
4 DPU
5 Re-Regulator
6 LDO
7 Non-Power Products
8 Microcontroller 9 Power Rail
10 Device
11 Memory

The invention claimed is:

1. An arrangement for connecting various integrated circuits in an automotive control system wherein at least two integrated circuits are connected by a bus being ASIL C/D compliant and forming a common bus protocol to exchange information among the integrated circuits, the arrangement comprising:
 a means for setting the frequency of operation, the frequency of operation adopted to ensure safe function of the at least two integrated circuits;
 a means for arbitrating roles of the at least two integrated circuits as master or slave device;
 a means for checking integrity of exchanged data, wherein the means for checking integrity includes means for performing a cyclic redundancy check (CRC) of data transmitted between the at least two integrated circuits and means for performing a temporal redundant check of data transmitted between the at least two integrated circuits;
 a means for frame repetition, which periodically gathers failures data information from each slave by a broadcast-inquiring by the master;
 a mechanism to detect bus stuck-at failure modes by counting the rising or falling edge of single pulse width modulation (PWM) data signals;
 a mechanism to filter or denounce failures and warnings from peripheral devices by validating and transferring to the bus failures having a duration longer than an expected time;
 a means for detecting remote out of specification local clock by implementing a bit counter to install a remote clock timing check; and
 a means for monitoring and predicting system reliability and profiling maintenance events by collecting precise temperature information about neighbor discrete components that are directly exposed to a junction temperature.

2. The arrangement of claim 1, wherein the bus is configured as a single wire interface bus.

3. The arrangement of claim 1, wherein the bus is configured to exchange telemetry information.

4. The arrangement of claim 3, wherein the bus is designed to exchange information about temperature, voltage, current, fault conditions, warnings, frequency or mode of operation.

5. The arrangement of claim 1, wherein the bus protocol is provided with an additional protocol layer implementing industry standard interfaces such as I2C, PMBUS, SMBUS, SVID, SPI, SCSI, PCIe or USB.

6. The arrangement of claim 1, wherein a power management IC (PMIC) is connected with one or more digital processing units (DPU) via the bus.

7. The arrangement of claim 6, wherein the power management IC (PMIC) is connected to an automotive SoC whereby the bus is safe controlling power delivery to the automotive SoC.

8. A method of performing data exchange between various integrated circuits in an automotive control system wherein the data are exchanged by a bus being ASIL C/D compliant and forming a common protocol to exchange information among the integrated circuits comprising the steps of
 setting the frequency of operation to ensure safe function of the various integrated circuits;
 arbitrating roles of the various integrated circuits as master or slave device;
 checking integrity of exchanged data, wherein checking integrated includes performing a cyclic redundancy check (CRC) and a temporal redundant check of data transmitted between the various integrated circuits;
 periodically gathering failures data information from each slave by a broadcast-inquiring by the master to provide frame repetition;
 detecting bus stuck-at failure modes by counting the rising or falling edge of single pulse width modulation (PWM) data signals;
 filtering or denouncing failures and warnings from peripheral devices by validating and transferring to the bus failures having a duration longer than an expected time;
 detecting remote out of specification local clock by implementing a bit counter to install a remote clock timing check; and
 monitoring and predicting system reliability and profiling maintenance events by collecting precise temperature information about neighbor discrete components that are directly exposed to a junction temperature.

9. The method of claim 8, wherein telemetry information is exchanged.

10. The method of claim 9, wherein information about temperature, voltage, current, fault conditions, warnings, frequency or mode of operation is exchanged.

11. The method of claim 8, wherein the bus protocol is provided with an additional protocol layer implementing industry standard interfaces such as I2C, PMBUS, SMBUS, SVID, SPI, SCSI, PCIe or USB.

12. The method of claim 8, wherein a power delivery to an automotive SoC is performed using safe controlling.

13. An arrangement for connecting various integrated circuits in an automotive control system wherein at least two integrated circuits are connected by a bus being ASIL C/D compliant and forming a common bus protocol to exchange information among the integrated circuits, the arrangement configured to
 set the frequency of operation to ensure safe function of the various integrated circuits;
 arbitrate roles of the various integrated circuits as master or slave device;
 check integrity of exchanged data, which includes performing a cyclic redundancy check (CRC) and a temporal redundant check of data transmitted between the various integrated circuits;
 periodically gather failures data information from each slave by a broadcast-inquiring by the master to provide frame repetition;
 detect bus stuck-at failure modes by counting the rising or falling edge of single pulse width modulation (PWM) data signals;
 filter or denounce failures and warnings from peripheral devices by validating and transferring to the bus failures having a duration longer than an expected time;
 detect remote out of specification local clock by implementing a bit counter to install a remote clock timing check; and
 monitor and predict system reliability and profiling maintenance events by collecting precise temperature information about neighbor discrete components that are directly exposed to a junction temperature.

14. The arrangement of claim 13, wherein the bus is configured as a single wire interface bus.

15. The arrangement of claim 13, wherein the bus is configured to exchange telemetry information.

16. The arrangement of claim 15, wherein the bus is designed to exchange information about temperature, voltage, current, fault conditions, warnings, frequency or mode of operation.

17. The arrangement of claim 13, wherein the bus protocol is provided with an additional protocol layer implementing industry standard interfaces such as I2C, PMBUS, SMBUS, SVID, SPI, SCSI, PCIe or USB.

18. The arrangement of claim 13, wherein a power management IC (PMIC) is connected with one or more digital processing units (DPU) via the bus.

19. The arrangement of claim 18, wherein the power management IC (PMIC) is connected to an automotive SoC whereby the bus is safe controlling power delivery to the automotive SoC.

\* \* \* \* \*